April 23, 1968     W. S. SEPICH ETAL     3,380,048
PRECISION ANGLE ENCODER TRANSDUCER
Filed March 18, 1965
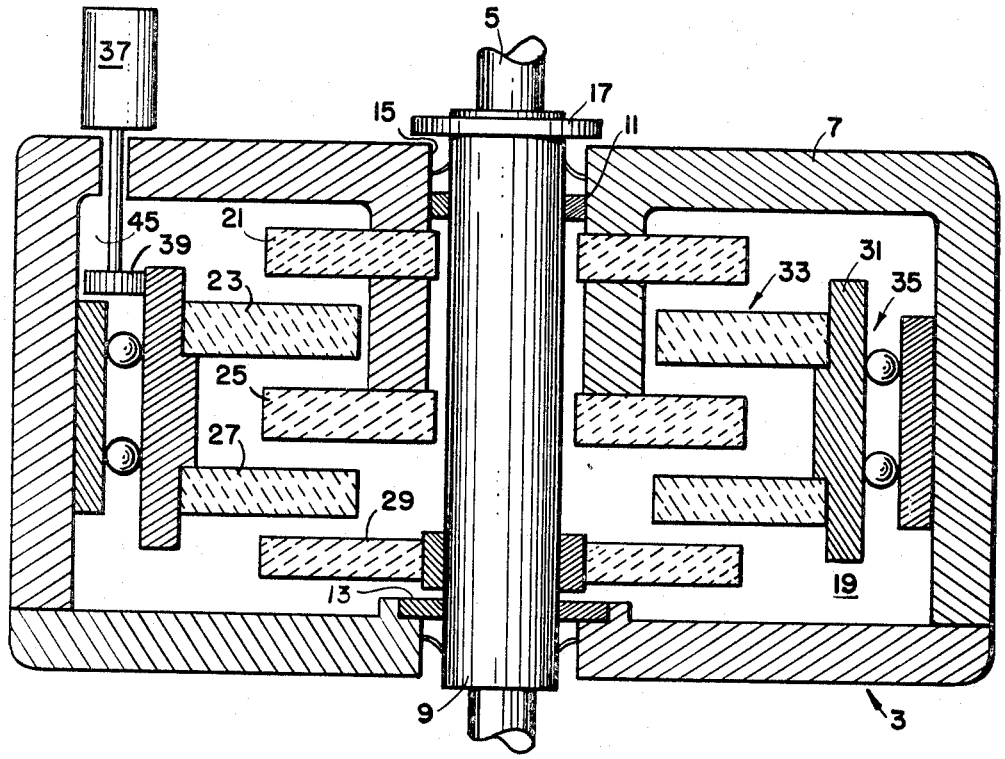
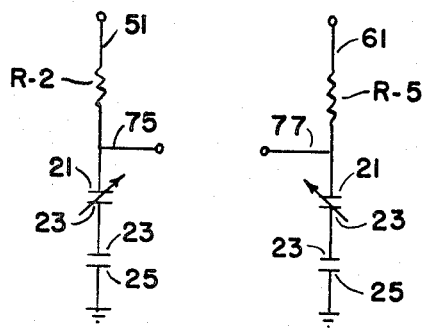
INVENTOR.
WILLIAM S. SEPICH
HARRY LANGER
BY
Arthur L. Collins
ATTORNEY April 23, 1968   W. S. SEPICH ET AL   3,380,048
PRECISION ANGLE ENCODER TRANSDUCER
Filed March 18, 1965   3 Sheets-Sheet 2

INVENTOR.
WILLIAM S. SEPICH
HARRY LANGER
BY
Arthur L. Collins
ATTORNEY

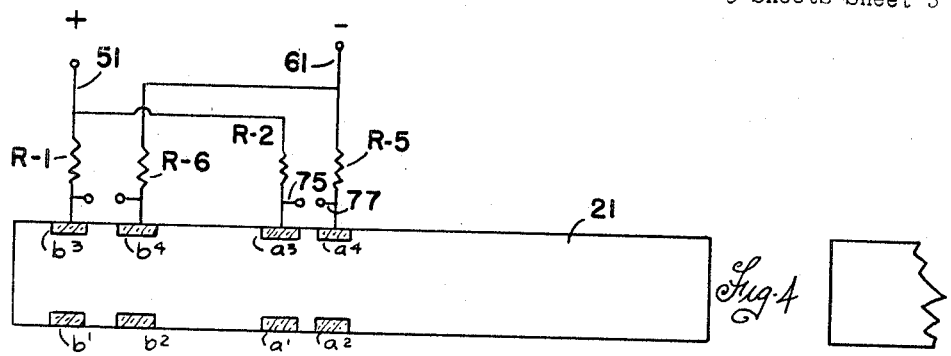
*Fig. 4*
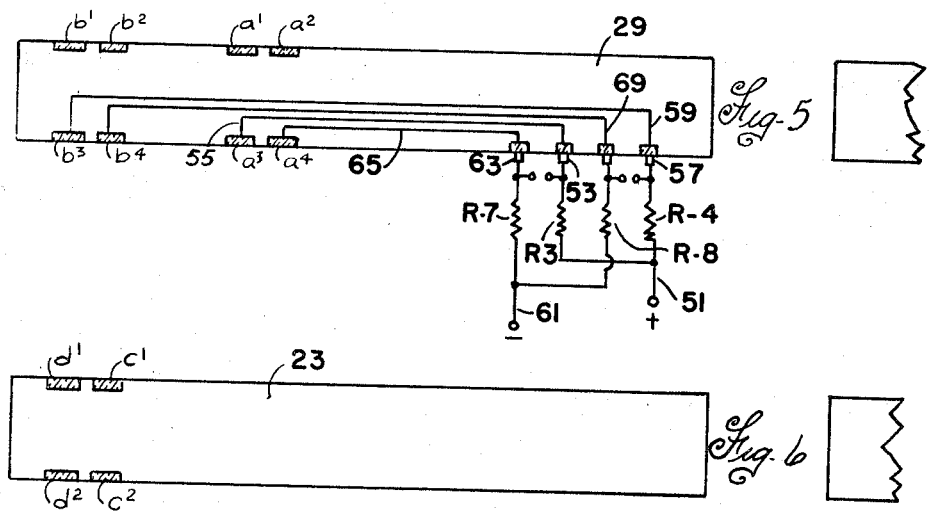
*Fig. 5*
*Fig. 6*
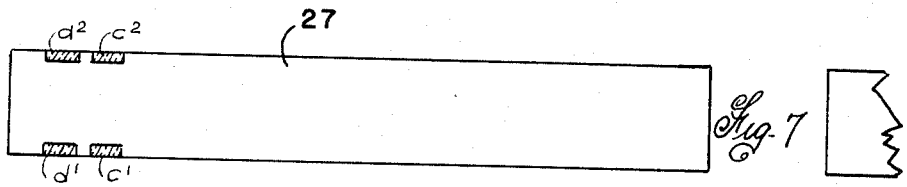
*Fig. 7*
INVENTOR.
WILLIAM S. SEPICH
HARRY LANGER
BY
Arthur L. Collins
ATTORNEY

United States Patent Office 3,380,048
Patented Apr. 23, 1968

3,380,048
PRECISION ANGLE ENCODER TRANSDUCER
William S. Sepich, Cinnaminson, and Harry Langer, Willingboro, N.J., assignors to the United States of America as represented by the Secretary of the Navy
Filed Mar. 18, 1965, Ser. No. 440,961
4 Claims. (Cl. 340—347)

The present invention relates to a novel and improved electrical device for sensing motion and direction of motion of a rotatable shaft or the like. More particularly, it relates to a novel and improved encoder transducer that converts angular motions of a shaft into coded electrical energy which when processed through a suitable electronic processing unit provides an unusually accurate reading of the shaft angular position in a twenty binary bit form.

In a radar unit, means must be provided to accurately measure the angular position of the radar antenna both in azimuth and in elevation. A direct shaft to digital converter is often used for this purpose. Such a converter generally consists of a transducer and an electronic processing unit. The transducer converts the angular position of the antenna into electrical energy consisting of coded sine waves and marker signals and the electronic processing unit decodes the transducer output and provides the desired data in binary form. Although various types of transducers have been used with an electronic processing unit in this manner in the past, considerable difficulty has been experienced heretofore in devising a transducer which provides desired precision and accuracy.

It is therefore a principal object of the present invention to provide a novel and improved encoder transducer that produces electrical signals from which binary angular position, angular velocity, angular acceleration and direction of rotation data of a rotating member may be obtained.

It is a further object of the invention to provide a novel and improved encoder transducer which is capable of providing shaft position data to a granularity of twenty binary digits.

It is a further object of the invention to provide a novel and improved encoder transducer in which the use of brush and slip ring assemblies is minimized.

It is a further object of the invention to provide a novel and improved encoder transducer which is directly coupled to the shaft to be monitored and thus eliminates inaccuracies due to gears, couplings and the like.

It is a further object of the invention to provide a novel and improved encoder transducer which incorporates an integration technique that provides greater accuracy than the mechanical layout of patterns on transducer glass disks used heretofore.

Other objects and many of the attendant advantages of this invention will be readily appreciated as the same becomes better understood by reference to the following detailed description when considered in connection with the accompanying drawing wherein:

FIG. 1 is a cross sectional view of a preferred embodiment of the improved transducer of the present invention;

FIG. 4 is a partial cross sectional view of one of the glass disks of the tranducer shown in FIG. 1;

FIG. 5 is a partial cross sectional view of another of the glass disks of the transducer shown in FIG. 1;

FIG. 6 is a partial cross sectional view of another of the glass disks of the transducer shown in FIG. 1;

FIG. 7 is a partial cross sectional view of still another glass disk of the transducer shown in FIG. 1; and FIG. 8 is an equivalent circuit of the portion of the transducer that produces the desired reference and marker signals through the variable capacitance of one pair of gold coated glass disks and the fixed capacitance of another pair of gold coated glass disks.

Figure 2:
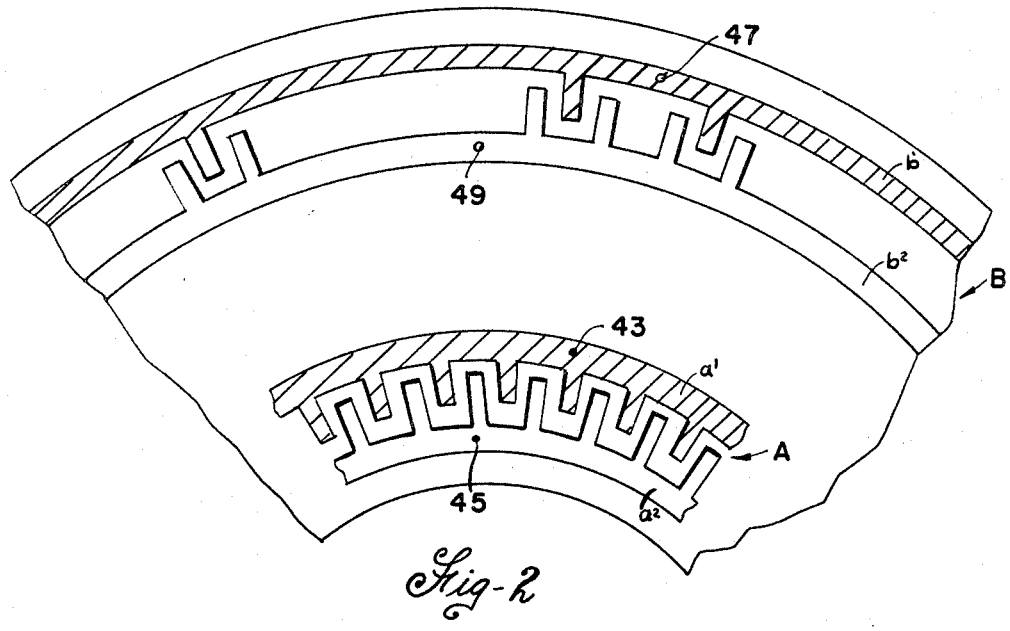
FIG. 2 is a partial plan view of one pair of the component glass disks in the transducer shown in FIG. 1.

The improved encoder transduced assembly 3 of the invention is mounted in any suitable conventional manner on the stationary base of the radar pedestal or the stationary base of any other device in which the angular disposition of a rotatable shaft 5 is to be monitored. The transducer assembly 3 includes a housing 7 and a sleeve 9 which is rotatably mounted by means of the bearing members 11 and 13 in an aperture 15 that extends through the housing 7 along the central axis of the transducer. The sleeve 9 is rigidly secured to the rotatable shaft 5 by means of the shaft clamp 17 or in any other suitable conventional manner. The housing 7 is constructed so as to provide the enclosed annular chamber 19 in which the flat, ground and polished glass annular disks 21, 23, 25, 27 and 29 are positioned about the central axis of the transducer in mutually parallel planes. Disk 29 is securely affixed to the sleeve 9 and therefore rotates with the shaft 9 in a manner which will be more apparent hereinafter. Disks 21 and 25 are rigidly mounted in the housing 7 and extend into the interior of the annular chamber 19 of the housing 7 as shown. Disks 23 and 27 are connected to a circular rim 31 which together with disks 23 and 27 form an enlarged wheel 33 that is rotatably mounted within the housing 7 on the conventional bearing member 35. The spacing of disks 21 and 25 and the position of disk 23 on the enlarged wheel 33 are designed such that minimal air space separate adjacent surfaces of disks 21 and 23 and disks 23 and 25. Similarly, the spacing of disks 25 and 29 and the disposition of disk 27 on wheel 33 are designed such that minimal air spaces separate disks 25 and 27 and disks 27 and 29. Three 60 cycle, constant speed, synchronous electric motors 37 (but one is shown in the drawing) are preferably secured to the external surface of the housing 7 of transducer 3 and are spaced 120 degrees apart about the central axis of transducer 3. Friction wheels 39 which are secured to drive shafts 41 that extend from the armatures of the motors 37 through apertures in the housing 7 engage the rim of the enlarged wheel 33 and guarantee uniform angular velocity of the wheel 33 and its component disks 23 and 27.

Referring now to FIGS. 2, 4 and 5 of the drawing, it will be noted that a plurality of gold coated signal patterns are embedded in the surfaces of disks 21 and 29. The signal patterns on disks 21 and 29 are identical and are shown in detail in FIG. 2 of the drawing. On one side of disks 21 and 29, there are two concentric sets of signals. One set of signals A includes a group of 1024 identical equally spaced bars each of which is connected to a circular band $a^1$ and each of which radiate inwardly toward the center of the disk. The one set of signals A on one surface of disks 21 and 29 also includes another group of 1024 identical equally spaced bars each of which is connected to a circular band $a^2$ concentric with the circular band $a^1$ and each of which radiate outwardly from the band $a^2$ between and equally spaced from each pair of inwardly radiating bar on band $a^1$. On the other side of each of the disks 21 and 29, there are two circular bands $a^3$ and $a^4$. Circular band $a^1$ on the one side of each of the disks 21 and 29 is electrically connected to the circular band $a^3$ preferably through a plurality of gold coated apertures 43 in each of the disks 21 and 29. Similarly, the circular band $a^2$ on the one side of each of the disks 21 and 29 is electrically connected to the circular band $a^4$ preferably through a plurality of gold coated apertures 45 in each of the disks 21 and 29.

The other set of signals B on the one side of disks 21 and 29 includes 25 identical bars each of which is connected to a circular band $b^1$ and each of which radiates inwardly toward the center of the disk. The 25 bars are positioned on radii about the circular band $b^1$ at the following angles from the axis of a reference tooth:

| Tooth position to: | Angular position reference datum |
|---|---|
| T1 | 0°51′3.8″ |
| T2 | 1°42′7.7″ |
| T4 | 3°24′15.3″ |
| T9 | 7°39′34.5″ |
| T15 | 12°45′57.4″ |
| T25 | 21°16′35.7″ |
| T40 | 34°2′33.2″ |
| T57 | 48°30′38.3″ |
| T77 | 65°31′54.9″ |
| T99 | 84°15′19.2″ |
| T126 | 107°14′2.6″ |
| T155 | 131°54′53.6″ |
| T188 | 160°0′0″ |
| T223 | 189°47′14.0″ |
| T257 | 218°43′24.3″ |
| T287 | 244°15′19.2″ |
| T314 | 267°14′2.6″ |
| T337 | 286°48′30.6″ |
| T359 | 305°31′54.9″ |
| T378 | 321°42′7.7″ |
| T394 | 335°19′8.9″ |
| T406 | 345°31′54.9″ |
| T414 | 352°20′25.5″ |
| T420 | 357°26′48.5″ |

The set of signals B on disks 21 and 29 also include another group of 25 pairs of identical bars each of which is connected to the circular band $b^2$ and each of which radiate outwardly from the band $b^2$ equal distances on either side of the 25 inwardly radiating bars. On the other side of each of the disks 21 and 29, there are two additional circular bands $b^3$ and $b^4$. Circular band $b^1$ on the one side of each of the disks 21 and 29 is electrically connected to the circular band $b^3$ preferably through a plurality of gold coated apertures 47 in each of the disks 21 and 29. Similarly, the circular band $b^2$ on the one side of each of the disks 21 and 29 is electrically connected to the circular band $b^4$ preferably through a plurality of gold coated apertures 49 in each of the disks 21 and 29.

The positive D.C. source of electrical potential 51 is connected to the circular bands $a^3$ and $b^3$ on disk 21 respectively through resistors R–1 and R–2. The positive D.C. source 51 is also connected to the circular band $a^3$ on disk 29 through resistor R–3, the brush slip ring assembly 53 and conductor 55. Similarly the positive D.C. source 51 is connected to the circular band $b^3$ on disk 29 through resistor R–4, the brush slip ring assembly 57 and conductor 59. The negative D.C. source of electrical potential 61 is connected to the circular bands $a^4$ and $b^4$ on disk 21 respectively through resistors R–5 and R–6. The negative D.C. source 61 is also connected to the circular band $a^4$ on disk 29 through resistor R–7, the brush slip ring assembly 63 and conductor 65. Similarly, the negative D.C. source 61 is connected to the circular band $b^4$ on disk 29 through resistor R–8, the brush slip ring assembly 67 and conductor 69.

Figure 3:
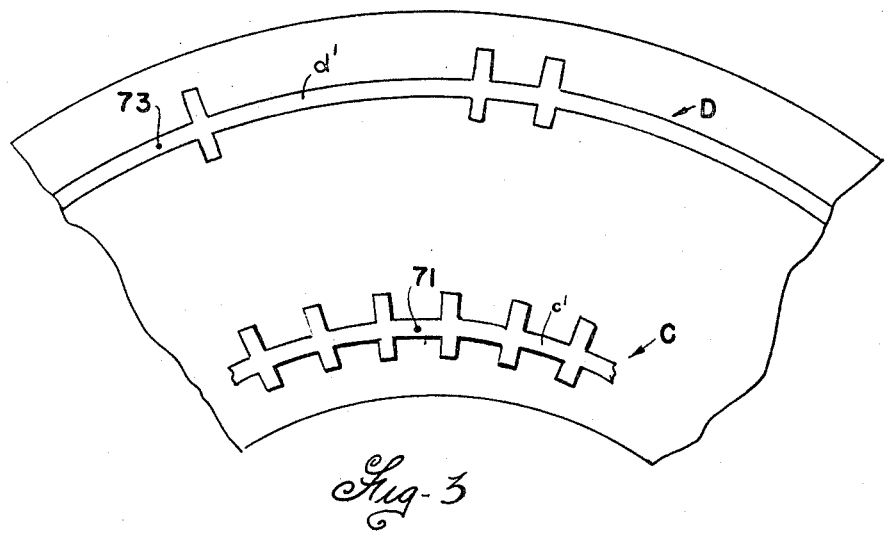
FIG. 3 is a partial plan view of another pair of component glass disks in the transducer shown in FIG. 1.

Referring now to FIGS. 3, 6 and 7 of the drawing, it will be noted that a plurality of gold coated signal patterns are also embedded in disks 23 and 27. The signal patterns on disks 23 and 27 are identical and are shown in detail in FIG. 3 of the drawing. On one side of each of the disks 23 and 27, there are two concentric sets of signals. One set of signals C on each disk is at times directly opposite the set of signals A on disks 21 and 29 and includes 1024 identical equally spaced bars each of which is connected to a circular band $c^1$. The other set of signals on each of the disks 23 and 27 is at times directly opposite the set of signals B on disks 21 and 29 and includes 25 identical bars each of which is connected to a circular band $d^1$. The 25 bars on circular band $d^1$ are positioned on radii of the disk at intervals similar to the manner in which the 25 bars are positioned about circular band $b^1$ of disks 21 and 29. On the other side of each of the disks 23 and 27, there are two circular bands $c^2$ and $d^2$. The circular band $c^1$ on the one side of each of the disks 23 and 27 is electrically connected to the circular band $c^2$ preferably through a plurality of gold coated apertures 71 in each of the disks 23 and 27. Similarly, the circular band $d^1$ on the one side of each of the disks 23 and 27 is electrically connected to the circular band $d^2$ preferably through a plurality of gold coated apertures 73 in each of the disks 23 and 27.

In operation as indicated hereinabove, disks 21 and 25 are fixed with respect to the transducer housing 7 and the stationary base of the radar pedestal or other device to be monitored. Disks 23 and 27 are driven by motor 37 at the constant angular rate of 4 revolutions per second. Disk 29 is affixed to and rotates with the shaft 5 to be monitored.

As disk 23 rotates at 4 revolutions per second, the pattern C on circular band $c^1$ scans the electric field established by the positive voltage patterns on circular band $a^1$ of disk 21. Each time a bar on circular band $c^1$ of disk 23 passes a bar on circular band $a^1$ of disk 21, a predetermined minimum electrical capacitance is produced. Each time the bars on disk 23 are midway between the bars on disk 21, a predetermined maximum electrical capacitance is produced. Thus, the capacitance between patterns A and C of disks 21 and 23 varies uniformly between a predetermined maximum and minimum capacitance 1024 (or $2^{10}$) times with each revolution of the wheel 33. Since the wheel 33 rotates at a constant angular velocity of 4 r.p.s., the capacitance between disks 21 and 23 varies at a frequency of 4096 cycles per second.

The circular band $c^2$ on the other side of disk 23 which is electrically connected to circular band $c^1$ is continuously capacity coupled to ground through the gold coated disk 25. Thus, a circuit is completed from the positive D.C. source of potential 51 successively through the resistor R–2, the variable capacitance between disks 21 and 23, and the fixed capacitance between disks 23 and 25 to ground to provide a 4096 cycle alternating signal on output conductor 75.

Similarly, the pattern C on circular band $c^1$ of disk 23 scans the electric field established by the negative voltage patterns on circular band $a^2$ of disk 21. As the wheel 33 rotates at 4 r.p.s., the capacitance between patterns C and A of disks 23 and 21 therefore also varies uniformly between predetermined maximum and minimum values at a frequency of 4096 cycles per second. The circular band $c^2$ on the other side of disk 23 is electrically connected to band $c^1$ and is continuously capacity coupled to ground through gold coated disk 25. Thus, a circuit is also completed from the negative D.C. source of potential 61 successively through resistor R–5, the variable capacitance between disks 21 and 23 and the fixed capacitance between disks 23 and 25 to ground to provide a 4096 cycle alternating signal on output conductor 77 which is 180 degrees out of phase with the signal on conductor 75. A 4.096 kc. sine wave reference signal, which is one of the desired output signals of the transducer 3, is thus developed across output conductors 75 and 77. An equivalent circuit of this electrical circuit from sources 51 and 61 to ground is shown in FIG. 8 of the drawing.

Simultaneously, as the wheel 33 rotates at 4 r.p.s., the pattern D on circular band $d^1$ of disks 23 and 27 scan the electric fields established by the positive and negative voltage patterns B on circular bands $b^1$ and $b^2$ of disks 21 and 29. The patterns B and D of bars on disks 21, 23, 27 and 29 are so spaced about their respective circular bands that all 25 bars of one disk are directly opposite the 25 bars of the adjacent disk in one and only one relative angular position. In no other position are more than four bars on one disk directly opposite bars on an adjacent disk. Thus, as disk 23 rotates at 4 r.p.s., the 25 teeth of patterns B and D on disks 21 and 23 are aligned once with each revolution of wheel 33 and a 4 cycle per second reference marker signal is produced through the variable capacitance of disks 21 and 23 and the fixed capacitance of disks 23 and 25 in a manner similar to the way in which the 4.096 kc. reference signal is developed by patterns A and C on disks 21 and 23.

Since the patterns on disks 27 and 29 are respectively identical to the patterns on disks 21 and 23, a similar pair of signals are produced by the rotation of disk 27 past disk 29. These two signals, which are called the variable signal and the variable marker, differ in frequency from the reference signals depending on movements of the disk 29 on shaft 5 which is to be monitored.

Thus, the encoder transducer 3 provides the following four signals:

(1) a reference signal which is a 4.096 kc. sine wave;
(2) a reference marker which is a pulse that occurs 4 times per second;
(3) a variable signal which is a sine wave whose center frequency is 4.096 kc. but which varies in frequency with velocity changes of the shaft 5 to be monitored; and
(4) a variable marker which is a pulse that occurs at a center frequency of 4 cycles per second and which varies therefrom with changes in the angular velocity of the shaft.

These four signals are then fed into a signal processing unit, the details of which form no part of this invention. For a full understanding of the present invention, it need only be understood that the signal processing unit multiplies the high frequency signals by 1024 to obtain the basic numbers of a twenty binary bit encoder, electronically combines these signals, and detects the difference beat frequency to determine the direction of rotation and the angular velocity of the shaft. By utilizing a high speed counter, the angular distance between the reference and variable marker signals also provides an accurate and continuous measure of the true angular position of the shaft.

Although the improved transducer is described hereinabove in the manner it might be used with a radar unit, it is to be understood that it could also be used with an optical tracker, a gun mount, a machine tool, or any other device on which the angular position of a rotating member must be accurately measured without departing from the spirit or scope of the invention.

Obviously, many modifications and variations of the present invention are possible in the light of the above teachings. It is therefore to be understood that within the scope of the appended claims, the invention may be practiced otherwise than as specifically described.

What is claimed is:

1. A precision transducer sensitive to the angular disposition of a rotatable member, said transducer comprising:
 (a) a first electrically non-conductive disk secured to the rotatable member for rotation therewith;
 (b) second and third electrically non-conductive disks fixedly mounted in separate planes parallel to the plane of the first disk;
 (c) a fourth electrically non-conductive disk positioned in a plane parallel to and between the second and third disks;
 (d) a fifth electrically non-conductive disk positioned in a plane parallel to and between the first and third disks, each of the five recited disks having a common axis of symmetry;
 (e) means for rotating the fourth and fifth disks in unison at a predetermined constant angular velocity;
 (f) means providing both sides of the peripheral surface of the third disk with a layer of an electrically conductive material;
 (g) means providing the surfaces of the fourth and fifth disks adjacent the third disk with a layer of an electrically conductive material;
 (h) means electrically connecting the layer of material on the third disk to ground;
 (i) means providing a first pattern of electrically conductive material on the surface of the first disk adjacent the fifth disk, said first pattern including 1024 identical equally spaced bars each connected to a first circular band;
 (j) a source of D.C. potential connected to first circular band;
 (k) means providing a second pattern of electrically conductive material on the said surface of the first disks, said second pattern including 25 identical bars each connected to a second circular band which is concentric with the first circular band, the said 25 bars being so spaced about the second circular band that when a pattern identical to the second pattern is provided on the adjacent surface of the fifth disk, the 25 bars of the juxtaposed patterns are directly opposite one another in one and only one rotational position;
 (l) means for connecting the source of D.C. potential to the second circular band;
 (m) means providing a first and second pattern of electrically conductive material on the surface of the second disk adjacent the fourth disk, similar to the patterns on the first disk;
 (n) means providing a pair of patterns of electrically conductive material on the surface of the fourth disk adjacent the second disk, the corresponding component bars of the patterns on the second and fourth disks being directly opposite one another when the second and fourth disks occupy predetermined relative rotational positions;
 (o) and means providing a pair of patterns of electrically conductive material on the surface of the fifth disk adjacent the first disk, the corresponding component bars of the patterns on the first and fifth disks being directly opposite one another when the first and fifth disks occupy predetermined relative rotational positions.

2. A precision transducer sensitive to the angular disposition of a rotatable member, said transducer comprising:
 (a) a first glass disk secured to the rotatable member for rotation therewith;
 (b) second and third glass disks, fixedly mounted in separate planes parallel to the plane of the first disk;
 (c) a fourth glass disk positioned in a plane parallel to and between the second and third disks;
 (d) a fifth glass disk positioned in a plane parallel to and between the first and third disks, each of the five recited disks having a common axis of symmetry;
 (e) a synchronous electric motor which drives the fourth and fifth disks in unison at a predetermined constant angular velocity;
 (f) means providing both sides of the peripheral surface of the third disk with a layer of an electrically conductive material;
 (g) means providing the surfaces of the fourth and fifth disks adjacent the third disk with a layer of an electrically conductive material;
 (h) means electrically connecting the layer of material on the third disk to ground;
 (i) means providing a first pattern of electrically conductive material on the surface of the first disk adjacent the fifth disk, said first pattern including 1024 identical equally spaced bars each connected to a first circular band;

(j) a source of D.C. potential connected to first circular band;

(k) means providing a second pattern of electrically conductive material on the said surface of the first disk, said second pattern including 25 identical bars each connected to a second circular band which is concentric with the first circular band, the said 25 bars being so spaced about the second circular band that when a pattern identical to the second pattern is provided on the adjacent surface of the fifth disk, the 25 bars of the juxtaposed patterns are directly opposite one another in one and only one rotational position;

(l) means for connecting the source of D.C. potential to the second circular band;

(m) means providing a first and second pattern of electrically conductive material on the surface of the second disk adjacent the fourth disk, similar to the patterns on the first disk;

(n) means providing a pair of patterns of electrically conductive material on the surface of the fourth disk adjacent the second disk, the corresponding component bars of the patterns on the second and fourth disks being directly opposite one another when the second and fourth disks occupy predetermined relative rotational positions;

(o) and means providing a pair of patterns of electrically conductive material on the surface of the fifth disks adjacent the first disk, the corresponding component bars of the patterns on the first and fifth disks being directly opposite one another when the first and fifth disks occupy predetermined relative rotational positions.

3. A precision transducer sensitive to the angular disposition of a rotatable member, said transducer comprising:

(a) a first glass disk secured to the rotatable member for rotation therewith;

(b) second and third glass disks, fixedly mounted in separate planes parallel to the plane of the first disk;

(c) a fourth glass disk positioned in a plane parallel to and between the second and third disks;

(d) a fifth glass disk positioned in a plane parallel to and between the first and third disks, each of the five recited disks having a common axis of symmetry;

(e) a synchronous electric motor which drives the fourth and fifth disks in unison at a predetermined constant angular velocity;

(f) means providing a gold coating on both sides of the third disk;

(g) means providing a gold coating on the surfaces of the fourth and fifth disks adjacent the third disk;

(h) means electrically connecting the gold coating on the third disk to ground;

(i) means providing a first gold coated pattern on the surface of the first disk adjacent the fifth disk, said first pattern including 1025 identical equally spaced bars each connected to a first circular band;

(j) a source of D.C. potential connected to the first circular band;

(k) means providing a second gold coated pattern on the said surface of the first disk, said second pattern including 25 identical bars each connected to a second circular band which is concentric with the first circular band, the said 25 bars being so spaced about the second circular band that when a pattern identical to the second pattern is provided on the adjacent surface of the fifth disk, the 25 bars of the juxtaposed patterns are directly opposite one another in one and only one rotational position;

(l) means for connecting the source of D.C. potential to the second circular band;

(m) means providing a first and second gold coated pattern on the surface of the second disk adjacent the fourth disk similar to the patterns on the first disk;

(n) means providing a pair of gold coated patterns on the surface of the fourth disk adjacent the second disk, the corresponding component bars of the patterns on the second and fourth disks being directly opposite one another when the second and fourth disks occupy predetermined relative rotational positions;

(o) and means providing a pair of gold coated patterns on the surface of the fifth disk adjacent the first disk, the corresponding component bars of the patterns on the first and fifth disks being directly opposite one another when the first and fifth disks occupy predetermined relative rotational positions.

4. A precision transducer sensitive to the angular disposition of a rotatable member, said transducer comprising:

(a) a first glass disk secured to the rotatable member for rotation therewith;

(b) second and third glass disks, fixedly mounted in separate planes parallel to the plane of the first disk;

(c) a fourth glass disk positioned in a plane parallel to and between the second and third disks;

(d) a fifth glass disk positioned in a plane parallel to and between the first and third disks, each of the five recited disks having a common axis of symmetry;

(e) a synchronous electric motor which drives the fourth and fifth disks in unison at a predetermined constant angular velocity;

(f) means providing a gold coating on both sides of the third disk;

(g) means providing a gold coating on the surfaces of the fourth and fifth disks adjacent the third disk;

(h) means electrically connecting the gold coating on the third disk to ground;

(i) means providing a first gold coated pattern on the surface of the first disk adjacent the fifth disk, said first pattern including a first set of 1024 identical equally spaced bars each connected to a first circular band and a second set of 1024 identical equally spaced bars positioned between each pair of bars of the first set and connected to a second circular band which is concentric to the first band;

(j) a soure of positive D.C. potential connected to the first circular band;

(k) a source of negative D.C. potential connected to the second circular band;

(l) means providing a second gold coated pattern on the said surface of the first disk, said second pattern including a first set of 25 identical bars, each connected to a third circular band, the said 25 bars being so spaced about the third circular band that when a pattern identical to the second pattern is provided on the adjacent surface of the fifth disk; the 25 bars of the juxtaposed patterns are directly opposite one another in one and only one rotational position, and a second set of 25 pairs of identical bars connected to a fourth circular band, the bars of each pair of bars being disposed an equal distance on opposite sides of the first set of 25 bars;

(m) means for connecting a source of positive D.C. potential to the third circular band;

(n) means for connecting a souce of negative D.C. potential to the fourth circular band;

(o) means providing a first and second gold coated pattern on the surface of the second disk adjacent the fourth disk similar to the patterns on the first disk;

(p) means providing a pair of gold coated patterns on the surface of the fourth disk adjacent the second disk, the corresponding component bars of the patterns on the second and fourth disks being directly opposite one another when the second and fourth disks occupy predetermined relative rotational positions;

(q) and means providing a pair of gold coated patterns on the surface of the fifth disk adjacent the first disk, the corresponding component bars of the patterns on the first and fifth disks being directly opposite one another when the first and fifth disks occupy relative rotational positions.

No references cited.

MAYNARD R. WILBUR, *Primary Examiner.*

W. J. KOPACZ, *Assistant Examiner.*